US010223416B2

(12) United States Patent
Li et al.

(10) Patent No.: US 10,223,416 B2
(45) Date of Patent: *Mar. 5, 2019

(54) PARTITION ACCESS METHOD FOR QUERY OPTIMIZATION

(71) Applicant: International Business Machines Corporation, Armonk, NY (US)

(72) Inventors: Shuo Li, Beijing (CN); Ping Liang, Beijing (CN); Ke Wei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,976

(22) Filed: Mar. 28, 2018

(65) Prior Publication Data

US 2018/0196849 A1 Jul. 12, 2018

Related U.S. Application Data

(63) Continuation of application No. 15/046,065, filed on Feb. 17, 2016, now Pat. No. 9,965,510, which is a continuation of application No. 14/746,321, filed on Jun. 22, 2015.

(51) Int. Cl.
*G06F 17/30* (2006.01)
(52) U.S. Cl.
CPC .. *G06F 17/30442* (2013.01); *G06F 17/30339* (2013.01); *G06F 17/30469* (2013.01); *G06F 17/30486* (2013.01); *G06F 17/30584* (2013.01)

(58) Field of Classification Search
CPC .................................................. G06F 17/30442
See application file for complete search history.

(56) References Cited

U.S. PATENT DOCUMENTS

| | | |
|---|---|---|
| 7,130,838 B2 | 10/2006 | Barsness et al. |
| 7,146,365 B2 | 12/2006 | Allen et al. |
| 7,925,648 B2 | 4/2011 | Barsness et al. |
| 8,126,870 B2 | 2/2012 | Chowdhuri et al. |
| 8,166,071 B1 | 4/2012 | Korablev et al. |
| 8,745,037 B2 | 6/2014 | Zhou et al. |

(Continued)

OTHER PUBLICATIONS

U.S. Appl. No. 15/046,065, filed Feb. 17, 2016.
(Continued)

*Primary Examiner* — Mohammad S Rostami
(74) *Attorney, Agent, or Firm* — Alexander G. Jochym

(57) ABSTRACT

In an approach to determining an access method for a partition in a partition table, a computer receives a query and determines if there is a partition table utilized by the query. When there is a partition table utilized by the query, then the computer determines that a partition in the partition table meets the plurality of conditions of the query. The computer collects a plurality of partition level statistics for the partition that meets the plurality of conditions of the query. Additionally, the computer determines, based, at least in part, on the plurality of partition level statistics, a cost for one or more access methods for the partition that meets the plurality of conditions of the query. Furthermore, the computer determines, based, at least in part, on the cost for each access method, an access method for the partition that meets the plurality of conditions of the query.

1 Claim, 5 Drawing Sheets

(56) References Cited

U.S. PATENT DOCUMENTS

| | | | |
|---|---|---|---|
| 9,639,570 B2 | 5/2017 | Wright et al. | |
| 2006/0218123 A1 | 9/2006 | Chowdhurl et al. | |
| 2008/0059405 A1 | 3/2008 | Barsness et al. | |
| 2009/0037365 A1* | 2/2009 | Sinclair | G06F 17/30463 |
| 2011/0313999 A1* | 12/2011 | Bruno | G06F 17/30454 |
| | | | 707/718 |
| 2012/0047158 A1 | 2/2012 | Lee et al. | |
| 2012/0084278 A1* | 4/2012 | Franke | G06F 17/30587 |
| | | | 707/719 |
| 2013/0132405 A1 | 5/2013 | Bestgen et al. | |
| 2013/0212085 A1 | 8/2013 | Nica et al. | |
| 2015/0088857 A1 | 3/2015 | Lee et al. | |
| 2015/0347508 A1* | 12/2015 | Lang | G06F 17/30536 |
| | | | 707/718 |

OTHER PUBLICATIONS

U.S. Appl. No. 14/746,321, filed Jun. 22, 2015.
U.S. Appl. No. 15/937,934, filed Mar. 28, 2018.
List of IBM Patents or Patent Applications Treated as Related (Appendix P) Filed Herewith.
Herodotou et al., "Query Optimization Techniques for Partitioned Tables", Proceeding SIGMOD '11, Proceedings of the 2011 ACM SIGMOD International Conference on Management of Data, Jun. 12-16, 2011, pp. 49-60, <http://dl.acm.org/citation.cfm?id=1989330>.

\* cited by examiner

PARTITION ACCESS METHOD FOR QUERY OPTIMIZATION

BACKGROUND OF THE INVENTION

The present invention relates generally to the field of database management and more particularly to access path selection and query processing.

A database management system (DBMS) is designed to allow the definition, creation, querying, updating, and administration of databases, which are an organized or structured collection of data. Databases can use a partition table, which is a type of table using a data organization scheme in which table data is divided across multiple storage objects, called partitions or ranges, according to values in one or more table partitioning key columns of the table. A table partitioning key is an ordered set of one or more columns in a table. The values in the table partitioning key columns determine in which data partition each row belongs. Partitions of data can be added, attached, detached from a partitioned table and multiple data partition ranges may be stored in a table.

Partition tables may have indexed partition tables. An index is an ordered set of pointers to the data or records in a table. Columns in an index are used to identify data rows, or in some cases, blocks of data, are known as keys. A key can be unique or non-unique. An index may be used to ensure uniqueness since a table with a unique index cannot have rows with identical keys. Data within a partition table may be accessed by scanning the entire table sequentially as done in a table scan or by accessing an index on the table to locate specific rows. In some cases, by another scanning method such as scan sharing which provides the ability of a scan to use the buffer pool pages of another scan. Conventionally, a partition table is accessed by one access method.

Query optimization is a function of DBMS. A query is used to manage data, locate, and retrieve desired data from a database. A query optimizer attempts to determine the most efficient way to execute a given query by evaluating possible query plans for access paths into a database. Since database structure are often complex, the desired data can be collected from a database in different ways (e.g., through different data structures or in different orders). Each different path or way of locating and retrieving data from the database is an access path. Each access path usually requires different processing time, which drives different processing costs. The query optimization may consider the possible access paths or may be limited to an optimization level; an optimization cost, an optimization processing time, or other configured limitation so that only a number of alternative access paths with different data structures are evaluated to determine an effective solution that is typically close to the optimal solution.

SUMMARY

Embodiments of the present invention disclose a method, a computer program product, and a system for determining an access method for a partition in a partition table for query optimization. The computer system includes program instructions to receive a query and to determine whether there is a partition table utilized by the query. Responsive to determining there is a partition table utilized by the query, the computer system includes computer instructions to determine a partition in the partition table meets a plurality of conditions of the query, wherein the program instructions to determine include program instructions to determine the partition meets a predicate on a column of a table partitioning key for page range. Additionally, the computer system includes program instructions to collect a plurality of partition level statistics for the partition that meets the plurality of conditions of the query, wherein the collecting includes collecting one or more partition level statistics that include a high key/low key approach for a column in an index on the partition that meets the plurality of conditions of the query, wherein a high key is a highest value of the column and a low key is a lowest value in the column in the partition that meets the plurality of conditions of the query and wherein collecting includes collecting one or more of: a column cardinality of the partition that meets the plurality of conditions of the query, one or more storage requirements of the partition that meets the plurality of conditions of the query, a number of pages that contain rows in the partition that meets the plurality of conditions of the query, a number of pages in use in the partition that meets the plurality of conditions of the query, a number of rows in the partition that meets the plurality of conditions of the query, a number of rows in overflow for the partition that meets the plurality of conditions of the query, and a plurality of statistics using a high key/low key approach in one or more columns of the partition that meets the plurality of conditions of the query. The computer system includes program instructions to determine, based, at least in part, on the plurality of partition level statistics, a cost for one or more access methods for the partition that meets the plurality of conditions of the query and to determine, based, at least in part, on the cost for each of the one or more access methods, an access method of the one or more access methods for the partition that meets the plurality of conditions of the query, wherein the determining includes determining a lowest cost access method for the partition that meets the plurality of conditions of the query and includes determining one of: an index scan and a table scan for the access method. The computer system includes program instructions to determine an access method for at least a first additional partition that meets the plurality of conditions of the query and to determine an access path, based, at least in part, on the access method determined for the at least first additional partition that meets the plurality of conditions of the query and determining the access path by one of the following: a lowest cost and a hint. Furthermore, the computer system includes program instructions to determine whether the at least first additional partition and the partition that meets the plurality of conditions of the query use a same access path. Responsive to determining that the at least first additional partition and the partition that meets the plurality of conditions of the query use the same access path, the computer system includes program instructions to combine, during query optimization, the at least first additional partition and the partition that meets the plurality of conditions of the query with the same access path.

DETAILED DESCRIPTION

Embodiments of the present invention recognize that query optimizers traditionally determine an access path for a partition table using either an index scan or a sequential scan, which may be referred to as a table scan. Recent developments include proposals for hybrid execution of an index scan and a table scan on a partition table using a transformed query, which is re-written using a "union all" function. Embodiments of the present invention provide a method to improve the efficiency of access paths selected by a query optimizer by providing a partition access method that uses detailed partition level statistics for each partition in a partition table to determine an effective access method for each accessed partition. Based, at least in part, on the determined access method for each partition in the partition table, an access path is determined by the query optimizer utilizing the determined access method for each partition accessed by the query. The access path may include one or more access methods determined by partition access method module using, at least, the partition level statistics and the query.

Figure 1:
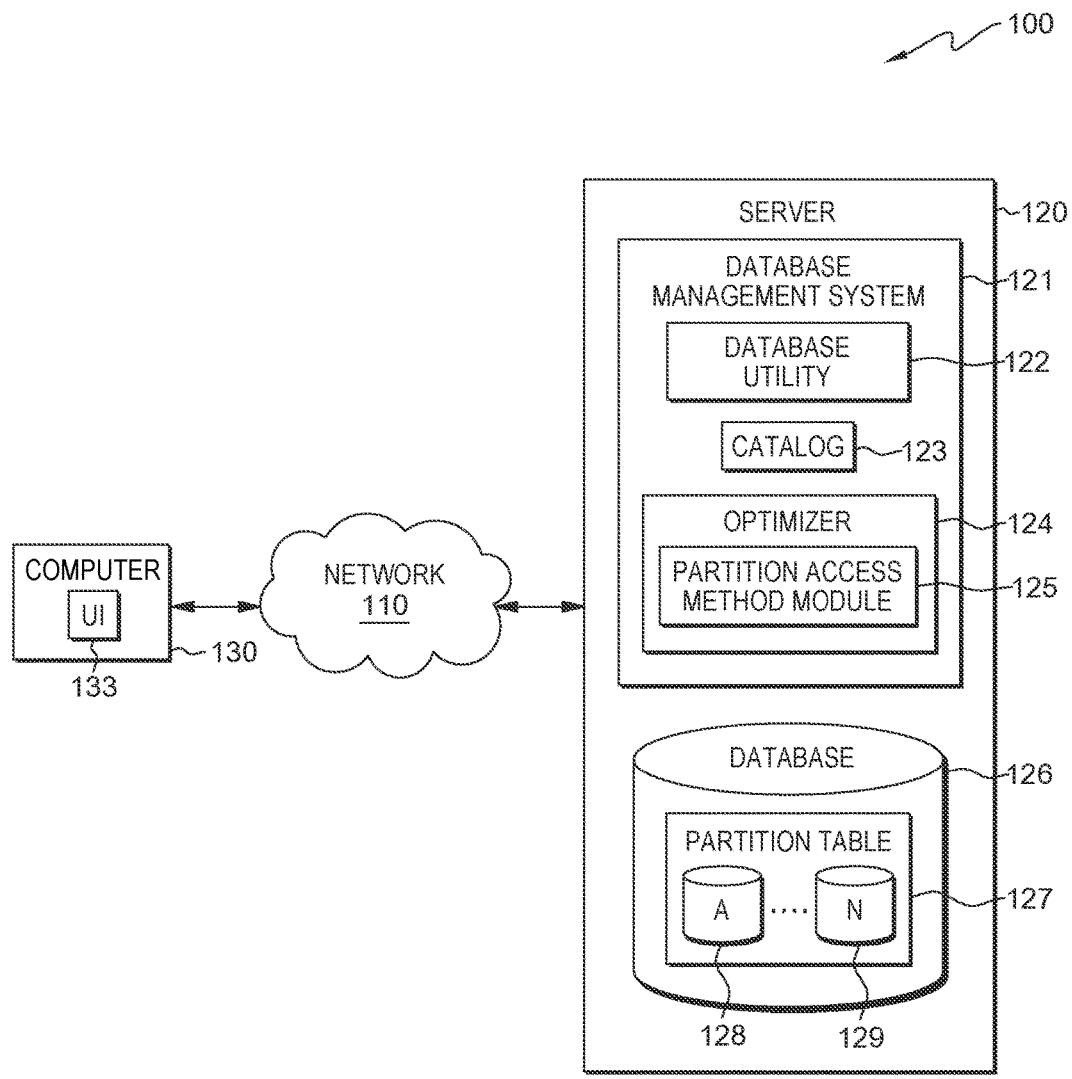
FIG. 1 is a functional block diagram illustrating a distributed data processing environment, in accordance with an embodiment of the present invention.

Implementation of embodiments of the invention may take a variety of forms, and exemplary implementation details are discussed subsequently with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 120 and computer 130 interconnected over network 110. Network 110 can be, for example, a telecommunications network, a local area network (LAN), a virtual LAN (VLAN), a wide area network (WAN), such as the Internet, or a combination of these, and can include wired, wireless, virtual, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server 120, computer 130 and other computing devices (not shown) within distributed data processing environment 100.

Server 120 can be a standalone computing device, a management server, a web server, a mobile computing device, or any other electronic device or computing system capable of receiving, sending, storing, and processing data. In another embodiment, server 120 can be a laptop computer, a tablet computer, a netbook computer, a personal computer (PC), a desktop computer, a personal digital assistant (PDA), a smart phone, or any programmable electronic device capable of communicating with computer 130 and other computing devices (not shown). In one embodiment, server 120 represents a computing system utilizing clustered computers and components (e.g., database server computers, application server computers, etc.) that act as a single pool of seamless resources, such as in a cloud computing environment, when accessed within distributed data processing environment 100. In various embodiments, each of the programs, applications, and databases on server 120 and computer 130 can reside on various other computing devices with distributed data processing environment 100, provided each has access to information and storage for implementation and operations of the present invention via network 110. In various embodiments, server 120 is a database server. A database server may be a multiprocessor computer with significant or large memory and a redundant array of independent disks (RAID). Server 120 hosts DBMS 121 and database 126. Server 120 sends and receives data from computer 130 via network 110. Server 120 stores data in database 126.

DBMS 121 is a database management system or a computer software application that support interactions with a user, other applications, and the database. DBMS 121 provides the functions for the definition, creation, updating, and administration of databases such as database 126. DBMS 121 may be a general-purpose DBMS designed to accommodate as many applications as possible or a special purpose DBMS such as an e-mail system. In one embodiment, a system-managed space is used in-place of a DBMS where the system-managed spaces are directories or file systems maintained by the underlying operating system. In the exemplary embodiment, DBMS 121 is a relational DBMS that resides on server 120 and includes database utility 122, catalog 123, and optimizer 124 with partition access method module 125. While depicted on server 120, DBMS 121 may reside on another server, another computing device, or other multiple computing devices within distributed data processing environment 100.

Database utility 122 is a utility used by database management systems to gather statistics or data on databases including, for example, information on database structure, tables, partitions, or columns within a table, but not limited to this data. For example, RUNSTATS is a utility in DB2® for query optimization that gathers information or statistics about the characteristics of the data in table spaces or tables, indexes, and partitions. The statistics collected by database utility 122 may be stored in a database catalog such as catalog 123. In various embodiments, catalog 123 resides in DBMS 121. In another embodiment, catalog 123 resides in database 126. A database catalog such as catalog 123 receives and stores data including statistics generated by a query, and other related information received from or retrieved by database utilities, applications or programs such as database utility 122, partition access method module 125, optimizer 124, or other database management applications not depicted in FIG. 1. While database utility 122 is depicted on server 120, database utility 122 may reside on another server, another computing device, or other multiple computing devices such as may be used in a cloud-computing environment.

Optimizer 124 is a query optimizer. As known to one skilled in the art, a query optimizer such as optimizer 124 determines the most efficient way to execute a query by considering possible query plans for determining an access path. Optimizer 124 evaluates the most efficient way to execute a query within a constraint or a set of constraints such as processing time for optimization, cost for optimization, a set number of possible execution paths evaluated, a pre-determined configured level of optimization or a user determined level of optimization for query optimization. Optimizer 124 includes partition access method module 125. When optimizer 124 determines that partition tables are utilized or accessed in query optimization, optimizer 124 sends the query to partition access method module 125, and in response, receives from partition access method module 125 an access method (e.g., index scan or table scan) for each partition in the partition table or tables. Optimizer 124 includes the ability to use one or more access methods (e.g., index scan or table scan) in an access path. Optimizer 124 evaluates multiple potential access paths, which may use one or more access methods for partitions in each access path. In various embodiments, optimizer 124 selects an access path for the query based, at least in part, on the lowest cost access path for a query. In one embodiment, optimizer 124 selects an access path based, at least in part, on a hint included in the query. For example, a hint may indicate one of: a rule based selection, an access path hint, a minimizing memory selection, a cost based selection, or a hint not to use an index. A hint provides guidance on the selections or decisions made by an optimizer (e.g., optimizer 124) or a module such as partition access method module 125. For example, a hint may provide direction on whether optimizer 124 evaluations of the various access paths are determined based on cost, rule based selection or another type of selection such as join order. In addition to conventional query optimization techniques, optimizer 124 is configured to utilize information on the access method for each partition provided by partition access method module 125 to determine an access path for a query.

Partition access method module 125 resides in optimizer 124 on server 120. Partition access method module 125 is the code and routines that evaluate the access method for each partition, based, at least in part, on the partition level statistics for each partition and the associated cost evaluated for each access method in each partition. When statistics are available for partitions, indicating a partition table is utilized in the query, partition access method module 125 receives a query from optimizer 124. In various embodiments, partition access method module 125 retrieves partition level statistics from catalog 123. The partition level statistics compiled by database utility 122 may be used by partition access method module 125 to determine an access method for each partition. For example, the access method for each partition that is used by the query (e.g., a partition that meets the conditions in the query) may be determined, based, at least in part on the partition level statistics, as an efficient or a low cost access method for the partition. For example, RUNSTATS (a database utility or command) may be used by partition access method module 125 to gather or collect partition level statistics; however, partition access method module 125 is not limited to this utility or command and may use other similar utilities in other database systems to gather partition level statistics. The partition level statistics includes one or more statistics such as identifying the column cardinality or the number of columns in the partition, the storage requirements of the partition, the number of pages that contain rows, the number of pages in use, the number of rows in the partition, and the number of rows in overflow. As known to one skilled in the art, the statistics for partitions such as the information on pages and number of rows are commonly collected by database utilities such as RUNSTATS where a page consists of a set of records that are either user data records or special system records (e.g., free space records about the table). In addition, database utility 122 is configured to collect additional partition level statistics for partition access method module 125 on full partitions using a high key/low key in a column or columns within the partition. A high key is the highest value of a column and a low key is the lowest value of a column. In various embodiments, partition access method module 125 retrieves the partition level statistics from catalog 123. In one embodiment, partition access method module 125 receives the partition level statistics from database utility 122. In an embodiment, partition access method module 125 retrieves partition level statistics from another database or storage location. Partition access method module 125 evaluates a cost for each access method for each partition based, in part, on the partition level statistics gathered by partition access method module 125.

In various embodiments, the partition level statistics collected or retrieved from catalog 123 by partition access method module 125 are used to determine the lowest cost access method for each partition accessed in a query. Partition access method module 125 provides a method of determining an access method for each partition in a partition table using partition level statistics such as high key and low key in a column in a partition, using known cost methods applied at the partition level. Partition access method module 125 determines the most efficient or lowest cost method (e.g., table scan or index scan) of accessing each partition in a partition table. Partition access method module 125 determines a cost using known cost estimating functions where the methodologies applied for providing estimates of processing time and cost for accessing data in a database are known to one skilled in the art. In various embodiments, partition access method module 125 determines an access method for each partition based on the cost analysis of each access method in each partition of a partition table. In one embodiment, a hint is used to aid in the determination of an access method for each partition. Partition access method module 125 provides optimizer 124 with an access method for each partition in a partition table used in a query based, at least in part, on partition level statistics for each partition in the partition table accessed by the query and a cost evaluation of each access method for each partition for an efficient, low cost query execution. While depicted as a module in optimizer 124, in other embodiments, the codes and routines of partition access method module 125 are included in optimizer 124. In another embodiment, partition access method module 125 is not included in optimizer 124 but is a separate program. In an embodiment, partition access method module 125 resides in one or more computers (e.g., computer 130, another computing device, or multiple computing devices not depicted in FIG. 1).

Database 126 resides on server 120. Database 126 includes partition table 127 with partition A (denoted as element 128) and partition N (denoted as element 129). Database 126 stores data such as a set of related data. Database 126 is a storage system that stores data in a structured or organized manner. Database 126 is co-operatively coupled with DBMS 121 for database creation, querying, updating, and database administration by DBMS 121. Database 126 could use, for example, relational or XML models, and could be stored on a server cluster or a mobile phone. In various embodiments, database 126 is a relational database on a server such as a database server, a server cluster, or a group of interconnected computing devices as may be used in a cloud. In various embodiments, database 126 includes partition table 127 with partitions A to N. Database 126 is accessible to computer 130 over network 110 and to the applications, functions, modules, and programs in DBMS 121 such as optimizer 124, partition access method module 125, and database utility 122 for statistics collection relating to the query (e.g., RUNSTATS). Database 126 may retrieve or store data received from DBMS 121, database utility 122, catalog 123, optimizer 124, or partition access method module 125 on server 120, computer 130, or another client computing device (not shown in FIG. 1) via network 110.

In various embodiments, computer 130 is a client to server 120. Computer 130 includes UI 133. Computer 130 may be a notebook, a laptop, a personal digital assistant, a tablet, a smart phone, wearable computing device, or other computing system connected to server 120 via network 110. Computer 130 sends and receives data and information such as queries to and from DBMS 121 and database 126 on server 120. Computer 130 may send and receive data from other computing devices (not shown). While computer 130 is depicted as a single client device, multiple computing devices or client devices may communicate and exchange data with DBMS 121 and database 126 on server 120 via network 110. UI 133 on computer 130 is a user interface providing an interface between a user of computer 130 and server 120, and enables a user of computer 130 to interact with programs and data on server 120, computer 130, and other computing devices (not shown). UI 133 may be a graphical user interface (GUI), an active area or line for text inputs, a web user interface (WUI), or other type of user interface and can display text, documents, user options, application interfaces, and instructions for operation such as queries, and include the information that a program present to a user. In an embodiment, UI 133 receives a user input via a touch screen, a key board, a mouse, a display, an audio, visual or motion sensing device or other peripheral device standard in computer devices. UI 133 may be used to by a user to generate a query and to display to the user the results of the query. A user may view the access path determined by optimizer 124 and the access methods for each partition determined by partition access method module 125 on UI 133 in addition to viewing data retrieved by the query.

Figure 2:
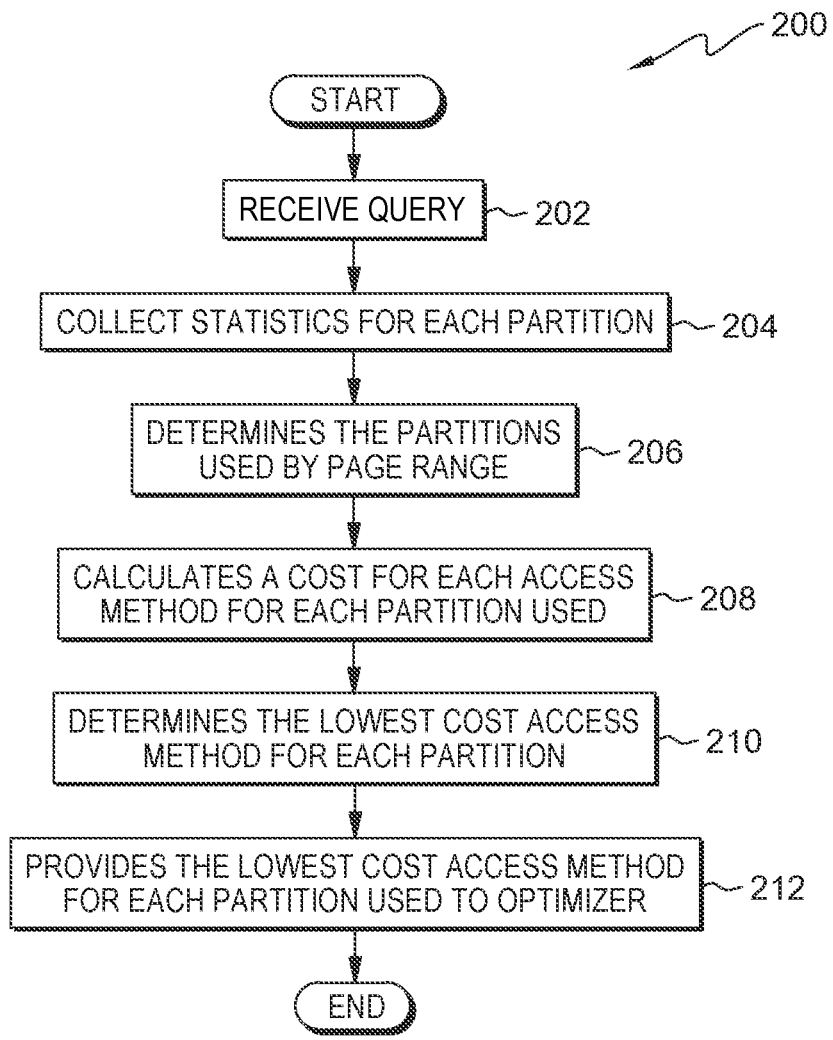
FIG. 2 is a flowchart depicting operational steps of a partition access method module in an optimizer, on a server within the distributed data processing environment, for determining an access method for each partition in a partition table in a database, in accordance with an embodiment of the present invention.

FIG. 2 is a flowchart 200 depicting operational steps of partition access method module 125 in optimizer 124, on server 120 within distributed data processing environment 100, for determining an access method for each partition in a partition table of a database, in accordance with an embodiment of the present invention. Partition access method module 125 receives a query (202). In various embodiments, partition access method module 125 receives queries with associated partition table statistics from optimizer 124. In an embodiment, partition access method module 125 receives a query from computer 130. In one embodiment, partition access method module 125 receives queries related to or accessing data on one or more partition tables. In an embodiment, partition access method module 125 receives queries accessing data or traversing one or more databases, for example, database 126.

Partition access method module 125 collects statistics for each partition (204). Upon receiving the query, partition access method module 125 begins query execution by retrieving the partition level statistics, for example, from catalog 123 on server 120. The partition level statistics include more than one of: the column cardinality or the number of columns in the partition, the storage requirements of the partition, the number of pages that contain rows, the number of pages in use, the number of rows in the partition, the number of rows in overflow, and the statistics collected using a high key/low key in a column or columns of the partition. The use of a high key/low key approach can be used to limit the required access to a partition where only the data specified between the high key for a column in an index and the low key for the column in the index is accessed. The high key/low key approach is applied to each appropriate or qualified partition according to the query specifications. A partition is qualified when it satisfies the predicates in the query, where a predicate is an element of a search condition that expresses a comparison condition.

In various embodiments, partition access method module 125 receives real-time statistics (RTS) from DBMS 121 for high key/low key column partition level statistics. Real-time statistics provide up to date or automatic updates to changes in the database on specified metrics as opposed to periodically updating the statistics by running a database utility 122, such as RUNSTATS. For example, partition access method module 125 retrieves real-time statistics for the high key/low key column for partition level statistics from DBMS 121 (e.g., a table in DBMS 121 (not depicted in FIG. 1)). In an embodiment, partition access method module 125 requests a re-bind process before collecting partition level statistics. For example, a re-bind may occur before executing database utility 122 and sending partition level statistics to catalog 123. A bind process can create a connection between the application program and the databases it will access. A bind process is typically performed before the database system initial use. A re-bind may occur periodically, or upon demand to ensure up to date data and connections with the database system between DBMS 121 and database 126.

In various embodiments, partition access method module 125 runs database utility 122 to update partition level statistics in catalog 123 prior to collecting the partition level statistics for the partitions qualified or associated with the query. In one embodiment, database utility 122 sends the partition level statistics to partition access method module 125. In another embodiment, partition access method module 125 retrieves the partition level statistics from catalog 123 in DBMS 121.

Partition access method module 125 determines the partitions used by page range (206). Partition access method module 125 checks the page range for predicates with a table partitioning key. The values in the table partitioning key columns are used to determine in which partition or data partition each table row belongs. In some embodiments, a check or evaluation of the page range for predicates using a table partitioning key allows a limited partition scan. In a limited partition scan, a predicate, subject to certain exceptions, on any column of the table partitioning key can be used to eliminate one or more partitions from a scan. The predicate, in this example, determines or eliminates partitions not in the page range identified by the predicate. For example, consider the following query:

SELECT...
FROM T
WHERE (C1 BETWEEN '2002' AND '3280' OR C1 BETWEEN '6000' AND '8000') AND C2 = '6'

Assume that table T has a partitioned index on column C1 and the values of C1 between 2002 and 3280 all appear in partitions 3 and 4 and the values for C1 between 6000 and 8000 appear in partitions 8 and 9 then, only these partitions need to be scanned for the query. In this example, partitions 3, 4, 8, and 9 meet the conditions or the predicate above for page range (e.g., the predicate on one or more columns of the table partitioning key) and are qualified for the page range with the above predicate example. The elimination of one or more partitions using the page range with predicates will aid in accurate cost calculating performed in the following step. In various embodiments, partition access method module 125 evaluates the predicates in the query or conditions of the query (e.g., the predicates using a table partitioning key) to determine the partitions that meet the predicates or conditions of the query (e.g., the qualified partitions). The elimination of some partitions, which do not meet all the predicates or the conditions of the query, for example, partitions eliminated by page range aids in improving query performance.

Partition access method module 125 calculates a cost for each access method for each partition used (208). Each qualified partition meeting the conditions of all the predicates in the query and selected for use by the query is analyzed for a cost associated with each access method that can be used for the partition. Using the retrieved partition level statistics and the query, partition access method module 125 applies conventional or known costing methodologies to determine a cost for each access method in each partition that meets each of the conditions of the query (e.g., each qualified partition). For example, an access cost for a qualified partition (e.g. meeting the query predicates such as a query predicate determining page range) may be determined for accessing the partition by a table scan and accessing the partition by an index scan. Partition access method module 125 provides cost estimates in service units and in milliseconds for statements such as SELECT, INSERT, UPDATE, and DELETE including both static and dynamic methods using costing methodologies known to one skilled in the art. In static cost methods, the statistics and host variables are static or set upon binding or bind completion and do not affect access paths once bind is complete. In a dynamic cost method, a dynamic binding allows changes for each query every time it is executed if statistics or host variables change providing costs that are more accurate but at a higher query processing cost.

In various embodiments, the cost estimates do not take into account cost adjustments for parallel processing, or the use of user-defined functions such as triggers. The cost of each access method for each qualified partition takes into account the range or amount of each qualified partition accessed as identified by the high key/low key in columns in a partition as specified by the query. Partition access method module 125 using the partition level statistics including high key/low key approach for a column in an index within the partition table evaluates and determines a cost for each access method for each partition. In one embodiment, partition access method module 125 uses the high key/low key for more than one column in one or more indexes (i.e., high key/low key approach applied to one column for each high key/low key pair and more than one high key/low key pair identified for one or more indexes).

Partition access method module 125 determines the lowest cost access method of each partition (210). Using the cost for each access method in each partition determined in the previous step, partition access method module 125 determines the access method providing the lowest cost for each partition in a query. For example, a partition table is created for car accidents by province in China where each province is a partition of the data on car accidents. The partition for car accidents for Beijing will be much larger and contain much more data records to be accessed than the partitions for Heibei and Sichuan provinces. In this example, partition access method module 125 determines an access method for each partition of the car accident partition table for a query retrieving data on car accidents by province. Partition access method module 125 evaluates the access cost for the data partition for Beijing (e.g., large amount of data or records to access) and determines a table scan is the lowest cost access method. For the partitions for Heibei and Sichuan (e.g., small amount of data or records to access), partition access method module 125 determines an index scan provides the lowest cost access method. In one embodiment, partition access method module 125 uses a hint to aid in the determination of an access method for each partition. For example, a partition level hint may provide direction on whether partition access method module 125 evaluations of access method are made based on cost, rule based selection or another type of selection such minimizing memory usage.

Partition access method module 125 provides the lowest cost access method for each qualified partition (212). In various embodiments, partition access method module 125 sends to optimizer 124 an access method for each partition that is used in a query where the access method provided is the lowest cost access method for each partition.

Figure 3:
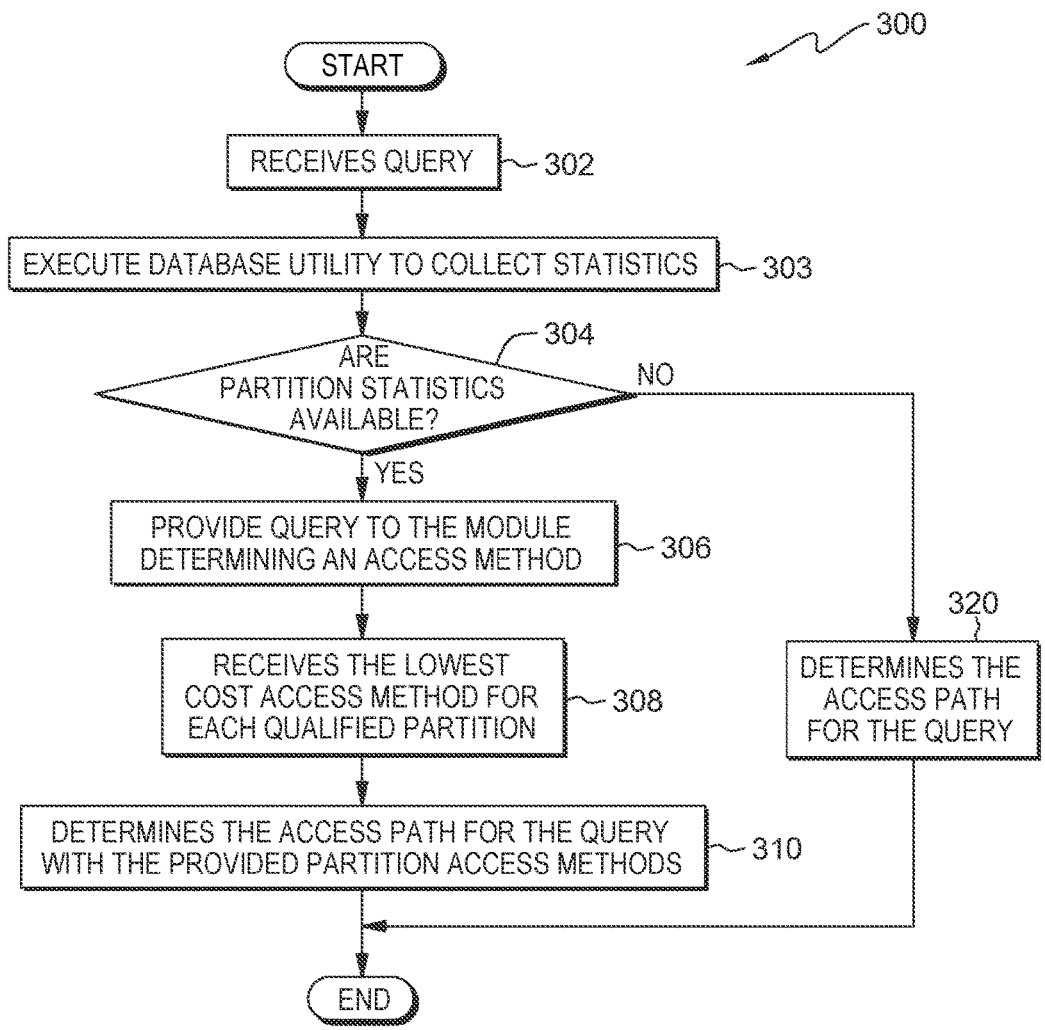
FIG. 3 depicts a flowchart of the steps of an optimizer on a server within distributed data processing environment, for determining an access path for a query in a partition table, based on the determined access method from the operational steps of FIG. 2, in accordance with an embodiment of the present invention.

FIG. 3 depicts a flowchart 300 of the steps of optimizer 124 on server 120 within distributed data processing environment 100, for determining an access path for a query in a partition table, based on the determined access method from the operational steps of FIG. 2, in accordance with an embodiment of the present invention. Optimizer 124 receives a query (302). Optimizer 124 receives a query input by a user on UI 133 and sent via network 110 to server 120. In the depicted embodiment, optimizer 124 executes database utility 122 to collect statistics (303). In order to ensure the most up to date data on database 126 is evaluated and collected, optimizer 124 runs database utility 122 to collect the most recent statistics related to the query. Upon database utility 122 execution to collect statistics, the updated statistics are stored in catalog 123. In an embodiment, the statistics are sent to partition access method module 125 and to catalog 123. In another embodiment, optimizer 124 queries catalog 123 to retrieve the stored statistics related to the query (i.e., without running database utility 122). In another embodiment, optimizer 124 initiates a re-bind process. Database utility 122 may be run after the re-bind process. The statistics are stored by database utility 122 in catalog 123 in DBMS 121 after re-bind and collection by database utility 122.

Optimizer 124 determines if there are partition statistics (decision 304). Optimizer 124 checks the statistics collected from catalog 123 for partition statistics, which indicate that there is a partition table utilized by the query. In various embodiments, optimizer 124 determines if there are partition level statistics and if the qualified rows used by the query are unique during bind. Unique qualified rows are rows for the records filtered by the unique index with one or more index keys by equal predicates.

If no partition level statistics are available (no branch, decision 304), then optimizer 124 determines the access path for the query (320). If there is not a partition table accessed by the query or no partition level statistics are available, then optimizer 124 uses known query optimization techniques to determine an access path for the query. The access path conventionally determined by methods known to one skilled in the art will use one access method for all partitions in a partition table (e.g., the access path uses table scan to access all partitions in a table or the access path uses an index scan to access all partitions in a table).

However, if the query accesses a partition table and partition level statistics are available (yes branch, decision 304), then optimizer 124 provides the query to the module determining an access method (306). In various embodiments, optimizer 124 determines that there are partition level statistics and that there are qualified rows which are used that are unique and, then proceeds. Optimizer 124 sends the query to the module (e.g., partition access method module 125) that determines the access method for each partition in the partition table used in the query. Optimizer 124 receives from partition access method module 125 the lowest cost access method for each qualified partition (308). An access method for each qualified partition (i.e., for each partition that meets the each of the conditions of the query) is sent to optimizer 124 by partition access method module 125.

Optimizer 124 determines an access path for the received query using the provided access methods (310). Optimizer 124 is configured to evaluate access paths using one or more access methods. Optimizer 124 is configured to support the application of different access methods in a partition table. Optimizer 124 may apply the configured capability during RUNTIME or other similar utility or program. For example, optimizer 124 is configured to evaluate an access path utilizing multiple access methods (e.g., one or more partitions in a partition table may be accessed using a table scan while one or more partitions in the same partition table may be accessed by an index scan). Optimizer 124 supports a multi-access method for partitions in a partition table in addition to using a single access method for a partition table (e.g., accessing all partitions in a partition table with an index scan). Upon receiving the determined access methods for each partition from partition access method module 125, optimizer 124 evaluates the possible access paths to determine an effective, low cost access path that utilizes the provided lowest cost access method for each partition. The access path determined by optimizer 124 includes one or more access methods to provide a more effective, lowest cost access path for a query where the lowest cost access method is applied to each partition. In some embodiments, optimizer 124 combines partitions using the same access path. When each of the partitions use the same or similar access path, the partitions can be combined together. For example, if three partitions in a partition table are accessed using a table scan, the partitions may be accessed in combination with the table scan. In one embodiment, optimizer 124 uses a hint to determine an access path.

In various embodiments, optimizer 124 uses known methods of analyzing catalog statistics, database design, and the details of the query to select an access path. Optimizer 124 can also take into account the central processor model data, the number of central processors, buffer pool size, buffer pool statistics, row identification (RID) pool size, and other similar costing techniques as known to one skilled in the art in conjunction with utilization of the access method for each partition received in step 308 to determine a low cost access path for a query. In one embodiment, optimizer 124 optimizes the access path using the lowest cost access path comparing the cost generated using the access method for each partition as determined by partition access method module 125 to a cost determined for an access path using a single access method (e.g., with traditional or known query optimizer methods). In various embodiments, the access path determined by optimizer 124 using partition access method module 125 is sent to computer 130 for display on UI 133 to the user.

Figure 4A:
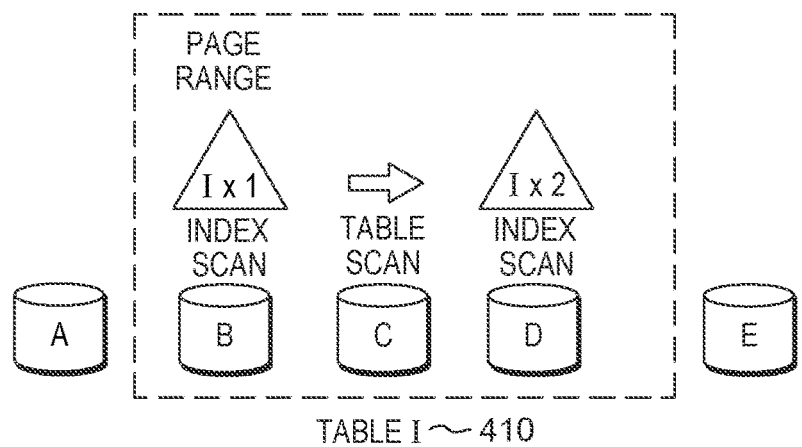
FIGS. 4A, 4B, and 4C depict examples of various access methods determined for a query by partition access method module for partition tables and utilized by an optimizer, in accordance with an embodiment of the present invention.
Figure 4B:
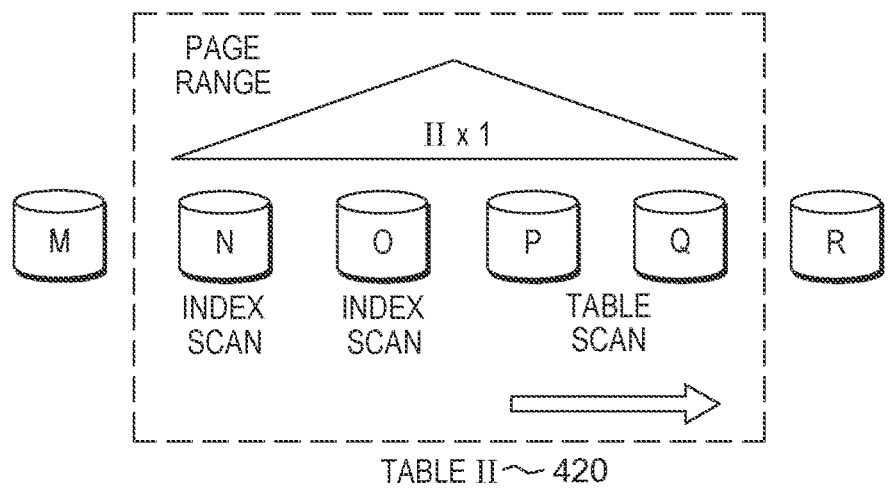
Figure 4C:
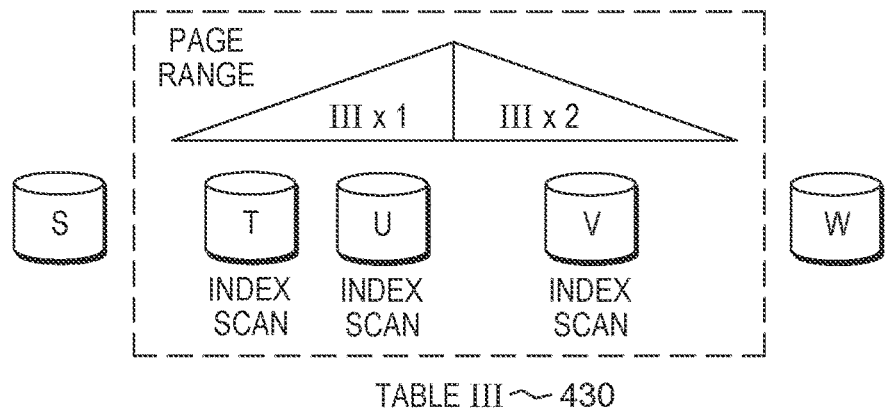

FIGS. 4A, 4B, and 4C depict examples of various access methods determined for a query by partition access method module 125 for partition tables I (410), II (420), and III (430) used by optimizer 124, in accordance with an embodiment of the present invention. Partition tables I (410), II (420) and III (430) illustrate examples of access paths that may be used in a determination of an access path by optimizer 124. FIG. 4A is an example of a partition table, Table I (410), with many records for some qualified partitions such as partition C and a few records in other qualified partitions such as partitions B and D. The qualified partitions (i.e., partitions B, C, and D) are identified by page range as depicted in Table I (410). Partitions A and E are not qualified or are outside of the page range identified in the query. Table I (410) has two data-partitioned secondary indexes (DPSI) where I×1 and I×2 are the data-partitioned secondary indexes used as the clustering index. In this example, the data rows are ordered in each partition (i.e., in partitions B and D) of the two data-partitioned secondary indexes (e.g., I×1 and I×2) to match the ordering keys of the data-partitioned secondary indexes. Indexes may be used to not only enforce or provide uniqueness of column values but, also to cluster data, partition tables, and provide an efficient access path as determined by an optimizer in query optimization.

As depicted on Table I (410) in FIG. 4A, partition access method module 125 has determined that an index scan is the lowest cost effective access method for partitions B and D and that a table scan is the lowest cost access method for partition C (e.g., larger amount of records accessed).

Table II (420) in FIG. 4B depicts a non-partitioned index, II×1 in table II (420). A non-partitioned index is a single index object that refers to the rows in a partition table. Non-partitioned index II×1 includes partitions M, N, O, P, Q, and R. Partitions N, O, P, and Q are qualified partitions as defined within the page range of the query. In this example, each of the partitions has a unique index. As determined by partition access method module 125 using the previously discussed method and steps of FIG. 2 and FIG. 3, the qualified partitions, N and O are accessed by an index scan. The qualified partitions P and Q in Table II (420) are accessed by a table scan according to partition access method module 125 determination. Partitions M and R are not qualified since the partitions are outside of the page range defined by the query (i.e., do not meet the conditions of the query).

Table III (430) in FIG. 4C is depicted with two non-partitioned indexes, III×1 and III×2. Table III (430) includes partitions S, T, U, V, and W where partitions T, U, and V are qualified as depicted by page range in the query. In this example, partition access method module 125 determines that partitions T, U, and V are accessed by an index scan for the lowest cost access method. Partitions S and W are not qualified or accessed by the query.

Figure 5:
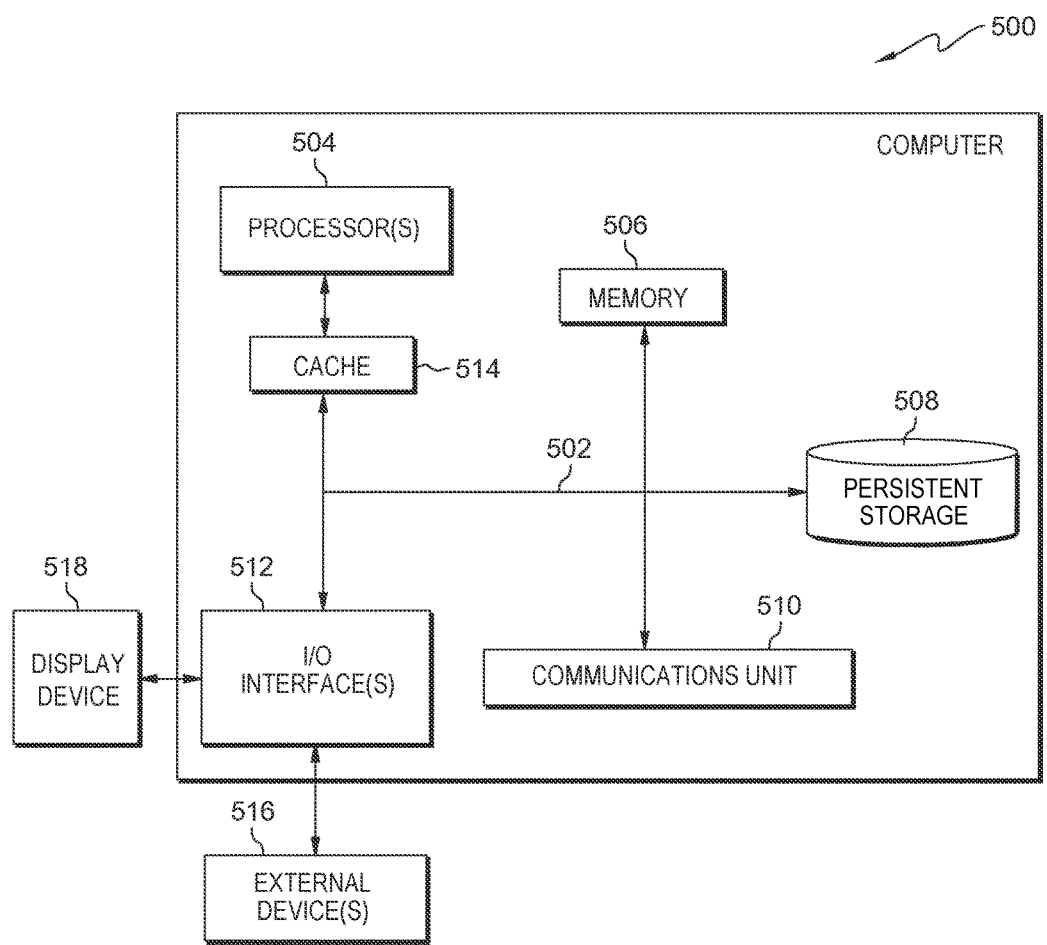
FIG. 5 depicts a block diagram of components of a computer system, which is an example of a system such as the server within the distributed data processing environment of FIG. 1, in accordance with an embodiment of the present invention.

FIG. 5 depicts a block diagram 500 of components of a computer system, which is an example of a system such as server 120 within distributed data processing environment 100, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server 120 includes processor(s) 504, cache 514, memory 506, persistent storage 508, communications unit 510, input/output (I/O) interface(s) 512, and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices, including resources of server 120, computer 130, and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A computer system for determining an access method for a partition in a partition table for query optimization, the computer system comprising:

one or more computer processors;
one or more computer readable storage media; and
program instructions stored on the one or more computer readable storage media for execution by at least one of the one or more processors, the program instructions comprising:
program instructions to receive a query;
program instructions to determine whether there is a partition table utilized by the query;
responsive to determining there is a partition table utilized by the query, program instructions to determine a partition in the partition table meets a plurality of conditions of the query, wherein the program instructions to determine include program instructions to determine the partition meets a predicate on a column of a table partitioning key for page range;
program instructions to collect a plurality of partition level statistics for the partition that meets the plurality of conditions of the query, wherein the collecting includes collecting one or more partition level statistics that include a high key/low key approach for a column in an index on the partition that meets the plurality of conditions of the query, wherein a high key is a highest value of the column and a low key is a lowest value in the column in the partition that meets the plurality of conditions of the query and wherein collecting includes collecting one or more of: a column cardinality of the partition that meets the plurality of conditions of the query, one or more storage requirements of the partition that meets the plurality of conditions of the query, a number of pages that contain rows in the partition that meets the plurality of conditions of the query, a number of pages in use in the partition that meets the plurality of conditions of the query, a number of rows in the partition that meets the plurality of conditions of the query, a number of rows in overflow for the partition that meets the plurality of conditions of the query, and a plurality of statistics using a high key/low key approach in one or more columns of the partition that meets the plurality of conditions of the query;
program instructions to determine, based, at least in part, on the plurality of partition level statistics, a cost for one or more access methods for the partition that meets the plurality of conditions of the query;
program instructions to determine, based, at least in part, on the cost for each of the one or more access methods, an access method of the one or more access methods for the partition that meets the plurality of conditions of the query, wherein the determining includes determining a lowest cost access method for the partition that meets the plurality of conditions of the query and includes determining one of: an index scan and a table scan for the access method;

program instructions to determine an access method for at least a first additional partition that meets the plurality of conditions of the query;

program instructions to determine an access path, based, at least in part, on the access method determined for the at least first additional partition that meets the plurality of conditions of the query and determining the access path by one of the following: a lowest cost and a hint;

program instructions to determine whether the at least first additional partition and the partition that meets the plurality of conditions of the query use a same access path; and responsive to determining that the at least first additional partition and the partition that meets the plurality of conditions of the query use the same access path, program instructions to combine, during query optimization, the at least first additional partition and the partition that meets the plurality of conditions of the query with the same access path.

* * * * *